(12) United States Patent
Holzapfel (10) Patent No.: US 10,813,495 B2
(45) Date of Patent: *Oct. 27, 2020

(54) GRILLING ACCESSORY AND GRILLING SYSTEM

(71) Applicant: Rational Aktiengesellschaft, Landsberg am Lech (DE)

(72) Inventor: Wolfgang Holzapfel, Munich (DE)

(73) Assignee: RATIONAL AKTIENGESELLSCHAFT, Landsberg am Lech (DE)

( * ) Notice: Subject to any disclaimer, the term of this patent is extended or adjusted under 35 U.S.C. 154(b) by 292 days.

This patent is subject to a terminal disclaimer.

(21) Appl. No.: 15/817,818

(22) Filed: Nov. 20, 2017

(65) Prior Publication Data

US 2018/0132657 A1    May 17, 2018

Related U.S. Application Data

(63) Continuation-in-part of application No. 14/567,108, filed on Dec. 11, 2014, now Pat. No. 9,848,730.

(30) Foreign Application Priority Data

Dec. 13, 2013   (DE) .................... 20 2013 105 686 U (51) Int. Cl.
*A47J 37/00* (2006.01)
*A47J 37/06* (2006.01)
*A47J 37/08* (2006.01)

(52) U.S. Cl.
CPC ......... *A47J 37/067* (2013.01); *A47J 37/0611* (2013.01); *A47J 37/0694* (2013.01); *A47J 37/0892* (2013.01)

(58) Field of Classification Search
CPC .. A47J 37/0611; A47J 37/0892; A47J 37/067; A47J 37/0694; A47J 2037/0617
USPC .................. 99/376, 377, 349, 388, 389, 450
See application file for complete search history.

(56) References Cited

U.S. PATENT DOCUMENTS

| | | | |
|---|---|---|---|
| 951,065 A * | 3/1910 | Ferguson | A47J 37/0611 219/524 |
| 2,066,507 A | 1/1937 | Yost | |
| 2,198,647 A | 4/1940 | Wolcott | |
| 2,652,766 A * | 9/1953 | Cralle | A47J 37/0611 99/349 |
| 3,369,481 A | 2/1968 | Pappas | |

(Continued)

FOREIGN PATENT DOCUMENTS

| | | |
|---|---|---|
| DE | 202005002549 U1 | 6/2005 |
| DE | 202011001853 U1 | 4/2011 |

(Continued)

*Primary Examiner* — Reginald Alexander
(74) *Attorney, Agent, or Firm* — Hayes Soloway PC (57) ABSTRACT

A grilling accessory for use in a cooking space of a cooking appliance is described, which includes two food carriers with at least one cooking area each, which contact a food at the same time. The food carriers are arranged to each other such that the respective cooking areas face each other, wherein at least one of the food carriers has openings in the respective cooking area, wherein the two food carriers are connected with each other via a connecting element comprising a joint. Further, a grilling system is described.

13 Claims, 8 Drawing Sheets

(56) References Cited

U.S. PATENT DOCUMENTS

| | | | |
|---|---|---|---|
| 4,011,431 A * | 3/1977 | Levin | A47J 37/0611 |
| | | | 219/524 |
| 4,492,152 A | 1/1985 | DeSantis | |
| 4,862,791 A | 9/1989 | Baughey | |
| 4,987,827 A * | 1/1991 | Marquez | A47J 37/0611 |
| | | | 99/331 |
| 5,974,954 A | 11/1999 | Rigney et al. | |
| 6,024,014 A | 2/2000 | Kasai | |
| 6,363,839 B1 * | 4/2002 | Wu | A47J 37/0611 |
| | | | 99/375 |
| 2007/0204856 A1 | 9/2007 | Elwell et al. | |
| 2009/0206074 A1 | 8/2009 | Schneider et al. | |
| 2009/0206075 A1 | 8/2009 | Lafferty | |
| 2012/0017776 A1 * | 1/2012 | Banjavich | A47J 36/22 |
| | | | 99/426 |
| 2013/0118475 A1 | 5/2013 | Armstrong et al. | |

FOREIGN PATENT DOCUMENTS

| | | |
|---|---|---|
| DE | 202011002323 U1 | 6/2011 |
| JP | 2004215868 A | 8/2004 |

\* cited by examiner

GRILLING ACCESSORY AND GRILLING SYSTEM

CROSS REFERENCE TO RELATED APPLICATION AND PRIORITY

This application is a Continuation-in-Part of U.S. application Ser. No. 14/567,108 filed Dec. 11, 2014, entitled, "Food Carrier and Grilling Accessory,", which itself claims priority of German Patent Application Serial No. 202013105686.3 filed Dec. 13, 2013, the entire disclosures of which are incorporated herein by reference.

FIELD

This invention relates to a grilling accessory for use in a cooking space of a cooking appliance, which includes two food carriers. Further, the invention relates to a grilling system.

BACKGROUND

From the prior art, food carriers are known which include a structured cooking area on which a food to be cooked can be placed. The food carrier along with the food lying on the structured cooking area is introduced into a cooking space of a cooking appliance. When cooking the food, the surface of the food with which the same lies on the structured cooking area receives the pattern of the structuring of the cooking area. Typically, a structured cooking area is employed when cooking meat, in order to produce a typical grill pattern in the surface of the meat. However, other items of food also can be provided with other patterns or it can generally be desired to have a variety of patterns on one and the same food, so that different food carriers with different patterns must be used. It is disadvantageous, however, that the different food carriers must be stowed away when not in use.

Furthermore, it can be desired that both surfaces of the food should have a pattern, so that the food on the food carrier must be turned during the cooking process. When the food now should have different patterns on its two surfaces, it is not only necessary to turn the food, but the food carrier also must be exchanged during the cooking process, which results in an increased expenditure of work.

It is the object of the invention to provide a space-saving and simple possibility for providing items of food with patterns.

BRIEF DESCRIPTION OF THE INVENTION

According to the invention, this object is solved by a grilling accessory for use in a cooking space of a cooking appliance, which includes two food carriers with at least one cooking area each, which contact a food at the same time, wherein the food carriers are arranged to each other such that the respective cooking areas face each other wherein at least one of the food carriers has openings in the respective cooking area, wherein the two food carriers are connected with each other via a connecting element comprising a joint.

According to another embodiment, this object is solved by a grilling accessory for use in a cooking space of a cooking appliance, which includes two food carriers with at least one cooking area each, which contact a food at the same time, wherein the food carriers are arranged to each other such that the respective cooking areas face each other, wherein the two food carriers are connected with each other via at least one of a fixing element, a suspension and a guiding element providing a precise fit of both food carriers, wherein at least one of the food carriers has openings in the respective cooking area.

With such grilling accessory it can be achieved that the food is cooked from both sides at the same time via the cooking areas. Turning the food on the food carrier thereby can be saved, whereby the expenditure during cooking of the food is reduced correspondingly. In addition, it is ensured that the food is uniformly cooked from both sides, so that the core of the food reaches the desired cooking point. The openings ensure that hot air or steam can flow through them in order to cook the food which is arranged on the respective cooking area appropriately while being used in the cooking space of the cooking appliance. The connecting element having a joint further simplifies the arrangement of the food to be cooked as the grilling accessory can be opened easily for accommodating the food. Once the food has been placed on the cooking area, the food carriers are swiveled with respect to each other in order to contact the food from both opposite sides.

In general, a food to be cooked thereby can be placed on one of the two food carriers, wherein the other food carrier is pressed down via the joint or the suspension, so that the food is kept pressed between the two cooking areas. The effect then is similar to a waffle iron. By the pressure produced it can be achieved that the food is cooked uniformly over its entire size. Especially with this embodiment it is possible to cook items of food of different heights from both sides at the same time. The joint or the suspension also can be formed as separate element which is attached to the food carriers.

The connection of the two food carriers using the fixing element or the connecting element represents a particularly simple possibility of connection. The two food carriers for example can include an opening through which the fixing element or the connecting element is introduced, in order to connect the two food carriers with each other. The fixing element or the connecting element can be a simple metal clip.

Via the guiding element, the food carriers can be connected with each other in a simple way, so that after placing the food on the first food carrier, the second food carrier can be inserted with a precise fit via the guiding element.

In particular, the two cooking areas can have a different structuring. The two surfaces of a food thereby can be cooked at the same time and nevertheless have different patterns.

Further, a food carrier for use in a cooking space of a cooking appliance is described, with a first cooking area and a second cooking area, on which a food to be cooked can be placed, in particular grilling areas, wherein the two cooking areas are arranged on opposite sides of the food carrier and have a different structuring. It is the idea underlying the invention to provide a food carrier which has two different structurings, so that one and the same food carrier can produce two different patterns in the food. Such food carrier thus can be referred to as turning food carrier. The number of the required food carriers can be reduced, whereby the required stowage space for the different food carriers is halved. Depending on the desired pattern on the food, the one or the other side of the food carrier can be used, so that the food carrier also can be utilized for different items of food, which typically have different patterns. Structuring is understood to be a structure different from an even surface.

One aspect provides that the structurings are formed by an integral body of the food carrier, which provides both the structuring on the first cooking area and the structuring on the second cooking area. Due to the integral design it is ensured that the food carrier can be cast in one manufacturing step. Furthermore, it thereby is ensured that there is a good conduction of heat through the entire food carrier, in particular to the two cooking areas.

According to one aspect, the food carrier is formed of metal. Metal represents a particularly suitable material with regard to the thermal conductivity and stability.

In particular, the first cooking area has a cross or rhombic structuring and the second cooking area has a stripe structuring. By means of the two structurings, the two most typical grill patterns can be produced in a food.

A further aspect of the invention provides that the food carriers are formed according to the type mentioned above. Thus, two food carriers with two differently structured cooking areas each can be connected with each other by means of a joint or a suspension, a fixing element or a guiding element, in order to be converted to a grilling accessory. In this way, a great variability can be produced, as in a grilling accessory in general up to four different structurings of the cooking areas can be used. Such grilling accessory thus is constructed in a modular fashion.

At least one of the cooking areas has at least one of a stripe structuring, a cross structuring and a rhombic structuring. Moreover, both cooking areas may have the same structuring, for instance a stripe structuring, a cross structuring or a rhombic structuring. Thus, the food to be cooked may comprise a respective grill pattern on its sides, in particular the same grill pattern on both sides such as a striped grill pattern.

Another aspect provides that the connecting element is established by a clip unit that comprises a guidance for at least one of both food carriers, wherein the guidance has a bracket with two legs being substantially parallel to each other. Thus, the respective food carrier is guided within the guidance, in particular the bracket that surrounds the food carrier partially. For instance, the bracket has substantially a C-shape wherein the rounded ends are formed by edges. Accordingly, the bracket has two legs that are substantially parallel to each other wherein the inner sides of the legs face each other and define the spacing for the food carrier to be guided.

Particularly, a spring is located at a first leg of the guidance such that the spring abuts the food carrier guided by the guidance. Accordingly, the food carrier is held in a safe manner since the food carrier is clamped within the bracket due to the spring. The spring also ensures that the thickness of the respective food carrier held in the guidance may vary.

Further, the spring may be assigned to the upper side of the food carrier. The spring presses the food carrier downwardly, namely in the same direction as gravity, against the other leg of the bracket which has no spring.

According to another aspect, the connecting element comprises at least one swivel-mounted holding member that maintains one of both food carriers. The holding member may also comprise a reception such that the other food carrier will be inserted into the reception wherein both food carriers can be swiveled with respect to each other due to the swivel-mounted holding member.

The at least one holding member may be connected to the bracket via the joint. Thus, the swiveling function is established by the joint.

According to an embodiment, the connecting element comprises at least one of the food carriers in a permanent manner. The connecting element that will be attached to one of the food carriers may comprise the other food carrier in a permanent manner such that a rigid connection is ensured.

Particularly, the joint is formed by a telescopic hinge being adjustable in height. Therefore, the space between both food carriers can easily be adapted with regard to the food to be cooked and placed between both food carriers.

Moreover, the connecting element may be formed separately with respect to at least one of the food carriers. Accordingly, the connecting element can be attached to the food carrier(s). This ensures that the respective food carriers can be used alone, for instance in a cooking chamber or a cooking space of a cooking appliance wherein the same food carrier can be used for establishing the grilling accessory by attaching the connecting element.

According to a certain embodiment, three food carriers are provided, each of the food carriers having at least one cooking area which contacts a food at the same time, wherein two food carriers are arranged with respect to the third one such that the respective cooking areas face the one of the third food carrier, wherein the two food carriers are connected to the third food carrier via a joint, respectively. The food to be cooked can be easily placed on the third food carrier when the other food carriers are swiveled with respect to the third one in an appropriate manner via the respective joints. Once the food is placed on the third food carrier, the other food carriers are swiveled back in order to contact the food to be cooked at the side of the food to be cooked that faces away from the third food carrier. Accordingly, it is ensured that both sides of the food carrier are contacted by the grill accessory.

Particularly, each of the two food carriers is connected to the third food carrier via a connecting element that comprises a guidance for the third food carrier, wherein the guidance has a bracket with two legs being substantially parallel to each other. Accordingly, the grilling accessory can be established easily.

For instance, the clips each comprise one of the food carriers in a permanent manner. Thus, the grilling accessory is established by attaching the clips to one of the food carriers, namely the third one, as the first and second food carrier are permanently connected to the respective clips. Adjusting or aligning of the food carriers is nor necessary.

According to an aspect, each of the two cooking areas has a structuring, the structuring of a first of the two cooking areas being different from the structuring of the second of the two cooking areas. Therefore, different grill patterns can be obtained.

At least one of the cooking areas may have at least one of a stripe structuring, a cross structuring and a rhombic structuring. Further, both cooking areas may have the same structuring, for instance a stripe structuring.

Furthermore, the invention provides a grilling system comprising a cooking appliance with a cooking space and at least one of the grilling accessory as mentioned above. The grilling accessory is placed within the cooking space such that the hot air and steam generated by the cooking appliance can flow through the openings within the food carrier(s) in order to heat the food to be cooked that is placed on the food carriers, in particular arranged between the at least two food carriers facing opposite sides of the food.

The cooking space may comprise a plating rack having at least one loading track defining a loading level, wherein the grilling accessory is held by the loading track. Accordingly, different grilling accessories and different foods accommodated within the grilling accessories can be cooked and/or finished simultaneously. The cooking appliance is configured to provide a certain atmosphere within the cooking space that might be adapted to the different foods to be cooked.

BRIEF DESCRIPTION OF THE DRAWINGS

Further advantages and features of the invention can be taken from the following description and the drawings to which reference is made. In the drawings.

DETAILED DESCRIPTION OF THE INVENTION

Figure 1:
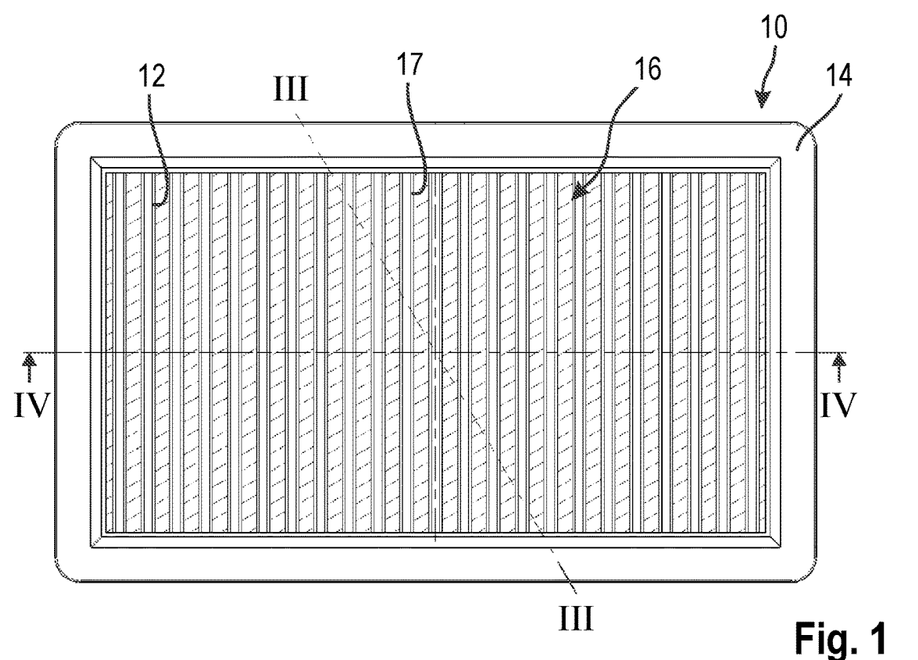
FIG. 1 shows a top view of a first cooking area of a food carrier used in a grilling accessory of the invention according to a first embodiment.

FIG. 1 shows a top view of a food carrier 10. The food carrier 10 comprises a body 12 as well as a circumferential rim 14.

On its opposite sides, the body 12 is designed as cooking areas 16, 18 which are surrounded by the circumferential rim 14. The first cooking area 16 (see FIG. 1) has a first structuring 17 which is formed as stripe structuring, so that the first cooking area 16 corresponds to a grate plate.

The second cooking area 18 (see FIG. 2) also is formed for accommodating a food and has a second structuring 19 which in the illustrated embodiment is formed as cross structuring, which also is referred to as criss-cross structuring. Both cooking areas 16, 18 are formed as grilling areas.

Figure 2:
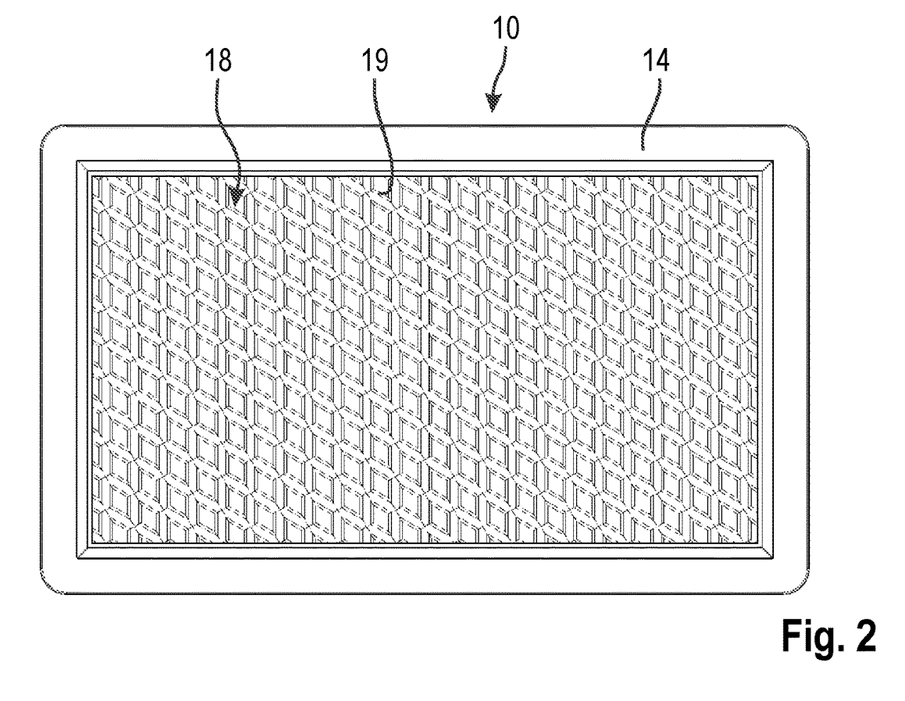
FIG. 2 shows a top view of a second cooking area of the food carrier as shown in FIG. 1.

It is also possible that instead of the cross structuring a rhombic structuring is used.

Figure 3:
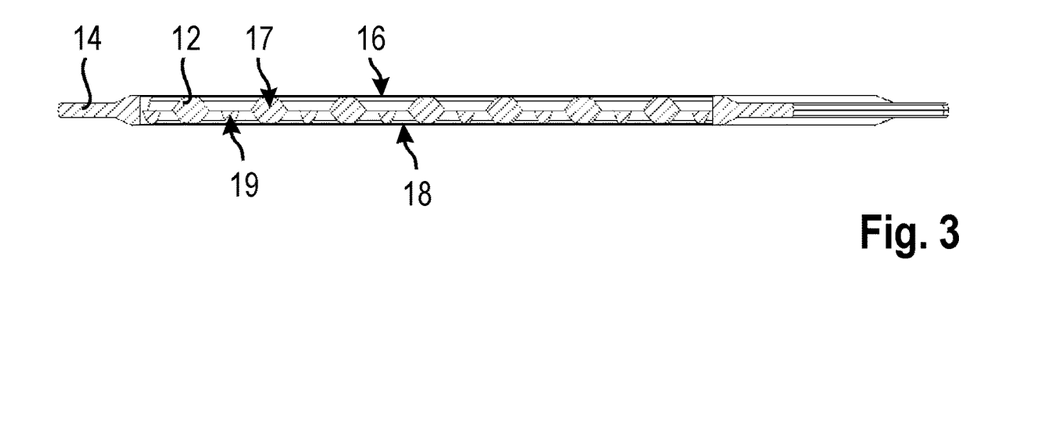
FIG. 3 shows a sectional representation through the food carrier of FIGS. 1 to 2.
Figure 4:
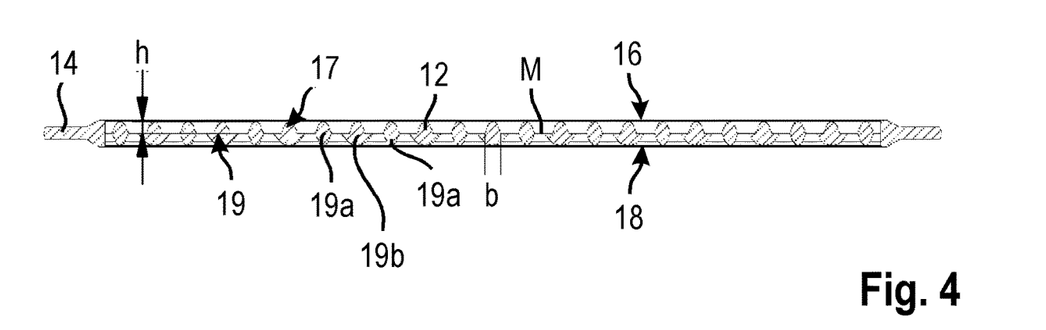
FIG. 4 shows a further sectional representation through the food carrier of FIGS. 1 to 3.

FIGS. 3 and 4 show sectional representations through the food carrier 10 of FIGS. 1 and 2, wherein FIG. 3 shows a section along line III in FIG. 1 and FIG. 4 shows a section along line IV.

FIGS. 3 and 4 reveal that the body 12 of the food carrier 10 is formed in one piece and forms the two structurings 17, 19 of the cooking areas 16, 18 on the opposite sides of the food carrier 10. Furthermore, the body 12 and the circumferential rim 14 also are formed integrally with each other, so that the entire food carrier 10 is formed in one piece. The entire food carrier 10, which can be formed of a metal, preferably is manufactured by a casting method.

Furthermore, the sectional representations reveal that the structurings 17, 19 associated to the two cooking areas 16, 18 each are formed with the same height, based on a median plane M of the body 12, wherein the respective structuring 17, 19 has a height h. The height h of a structuring 17, 19 can lie in a range from 5 mm to 10 mm, in particular amount to 7 mm. This height range ensures a sufficiently large thermal conductivity through the food carrier 10 with sufficient stability of the food carrier 10.

The structurings 17, 19 each are formed elliptical in cross-section in the broadest sense, wherein they converge to the respective cooking area 16, 18. The second structuring 19 furthermore is formed such that in cross-section it likewise has a partial stripe structuring, wherein two successive stripe elements 19a have a double distance as compared to the first structuring 17. Between two successive stripe elements 19a of the second structuring 19 broader elements 19b each are provided, so that altogether the criss-cross structuring 19 is obtained.

At the median plane M the stripe elements 19a as well as the structuring 17 have a width b which lies in the range from 5 mm to 15 mm, in particular amounts to 9.5 mm.

Figure 5:
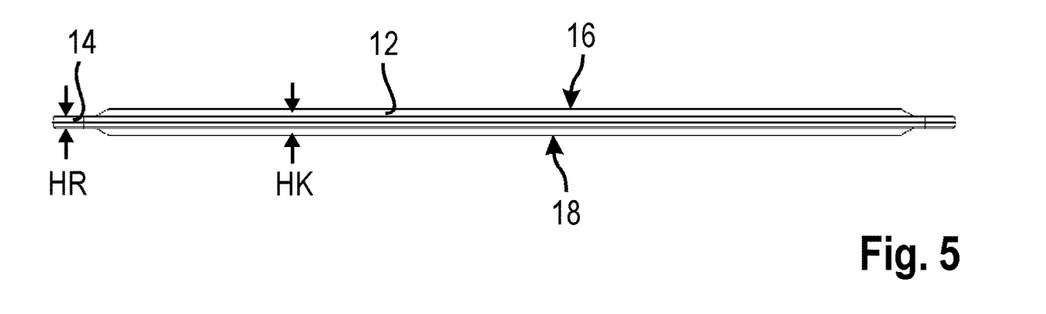
FIG. 5 shows a side view of the food carrier of FIGS. 1 to 4.

The side view of the food carrier 10 as shown in FIG. 5 reveals that the circumferential rim 14 has a height HR which is smaller than the height HK of the body 12. The ratio of the two heights HR:HK can be approximately 1:2, so that the height HR of the circumferential rim 14 approximately corresponds to the height h of one of the structurings 17, 19.

The transition from the circumferential rim 14 to the cooking areas 16, 18 is effected via ramps which include an angle between 20° and 40°, in particular 30°, to the surface of the circumferential rim 14.

Figure 6:
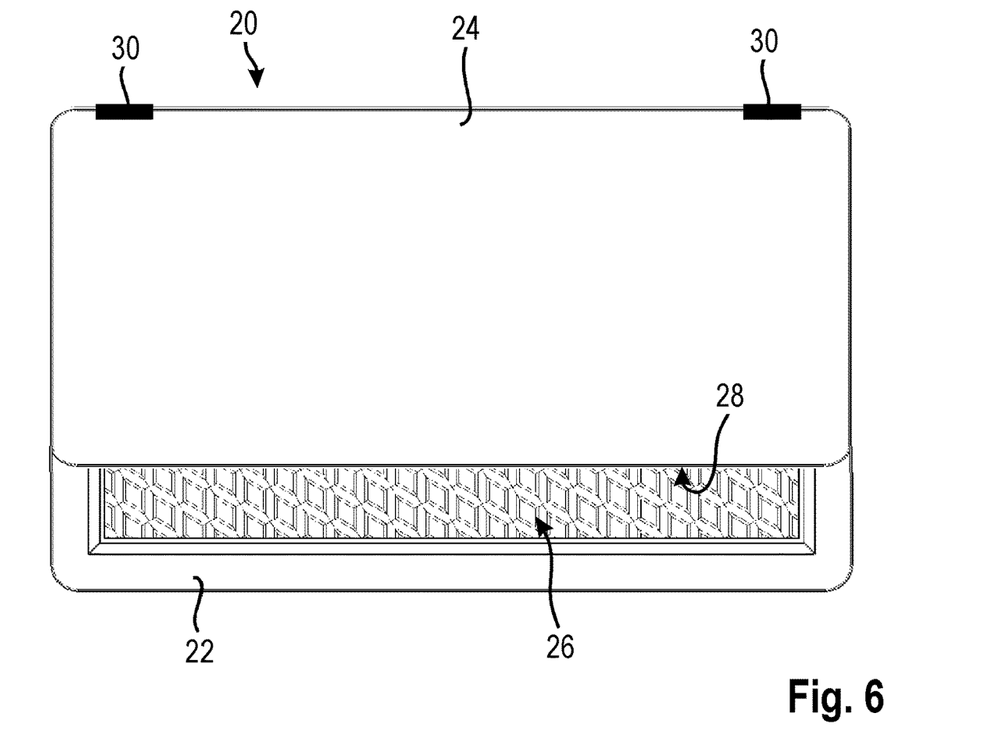
FIG. 6 shows a top view of a grilling accessory of the invention according to a first embodiment.

FIG. 6 shows a grilling accessory 20 which comprises a first food carrier 22 and a second food carrier 24 which is inclined with respect to the first food carrier 22. Both food carriers 22, 24 each have a cooking area 26, 28, which are arranged opposite each other. The cooking areas 26, 28 in addition each have a structuring, wherein only the structuring of the cooking area 26 is shown in the representation.

In the embodiment shown, the two food carriers 22, 24 are connected with each other via two joints 30, so that the second food carrier 24 can be shifted relative to the first food carrier 22.

A food to be cooked is placed on the first food carrier 22 or the first cooking area 26 of the grilling accessory 20. Subsequently, the second food carrier 24 is pivoted via the joints 30 such that the other surface of the food is contacted by the second cooking area 28 of the grilling accessory 20. It thereby is possible that the food is cooked from both sides at the same time by means of the two cooking areas 26, 28 and on both sides of the food a pattern is formed at the same time corresponding to the structuring of the cooking areas 26, 28.

The joints 30 can be formed as separate connecting elements which can be mounted to the food carriers 22, 24.

Alternatively, the two food carriers 22, 24 can be connected with each other by means of a guiding element or a fixing element, so that an easily manufacturable grilling accessory 20 is obtained. Furthermore, a cutout, depression or rib also can be provided in the rim for a clip via which the connection of the food carriers 22, 24 is provided.

In the embodiment shown the second food carrier 24 merely includes one cooking area with structuring, but it can also be provided that the food carrier 24 includes two cooking areas with different structuring.

Figure 7:
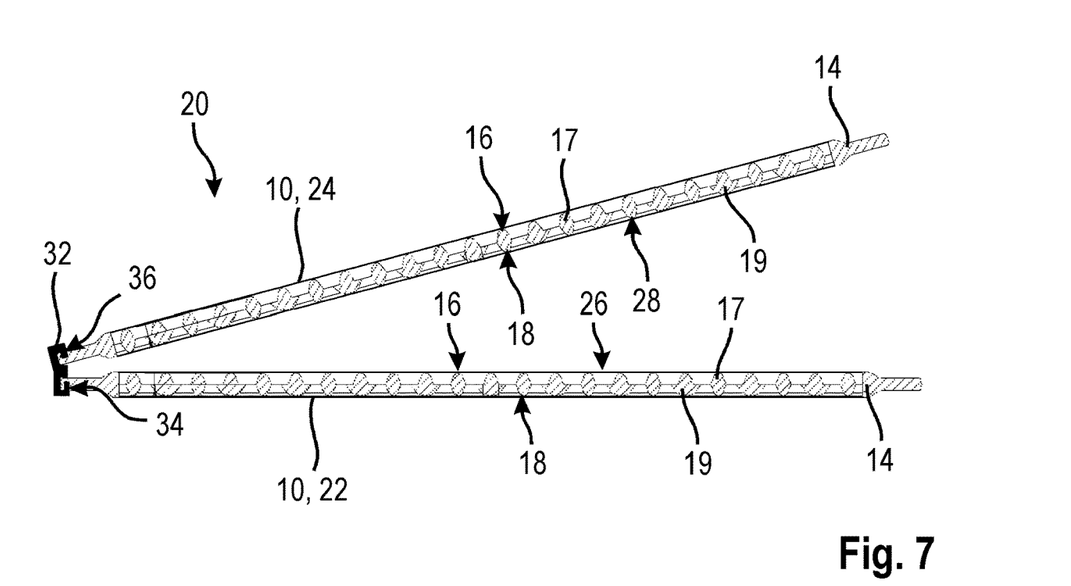
FIG. 7 shows a side view of a grilling accessory of the invention according to a second embodiment.

For the food carriers 22, 24 two of the food carriers 10 of FIGS. 1 to 5 can be used, as is shown in the embodiment of the grilling accessory 20 represented in FIG. 7.

The two food carriers 22, 24 are connected with each other via a clip 32, wherein the clip 32 engages into cutouts 34, 36 at the circumferential rim 14 of the food carriers 22, 24. Otherwise, the two food carriers 22, 24 each are formed exactly like the food carrier 10 of FIGS. 1 to 5, i.e. they each include a first cooking area 16 and a second cooking area 18 with different structuring 17, 19.

In the illustrated embodiment of the grilling accessory 20 the food carriers 22, 24 are arranged such that the first cooking area 16 of the first food carrier 22 forms the first cooking area 26 of the grilling accessory 20 and the second cooking area 18 of the second food carrier 24 forms the second cooking area 28 of the grilling accessory 20.

The relative arrangement of the food carriers 22, 24 can be changed as desired.

In addition, the two food carriers 22, 24 each can have different structurings, so that the grilling accessory 20 comprises a total of four different structurings.

The food carriers 22, 24 then can be combined with each other in the desired way.

With the grilling accessory 20 it is possible to cook the food from both sides in a simple way. In particular in the embodiment of the two food carriers 22, 24 analogous to the embodiment of the food carrier 10 according to FIGS. 1 to 5 a variety of patterns can be produced in the food, and due to the modular construction required stowage space can be saved.

In FIGS. 8 to 13 a second embodiment of a food carrier 10 is shown, wherein identical or functionally identical elements are provided with the same reference numerals as in the first embodiment.

Figures 8, 9:
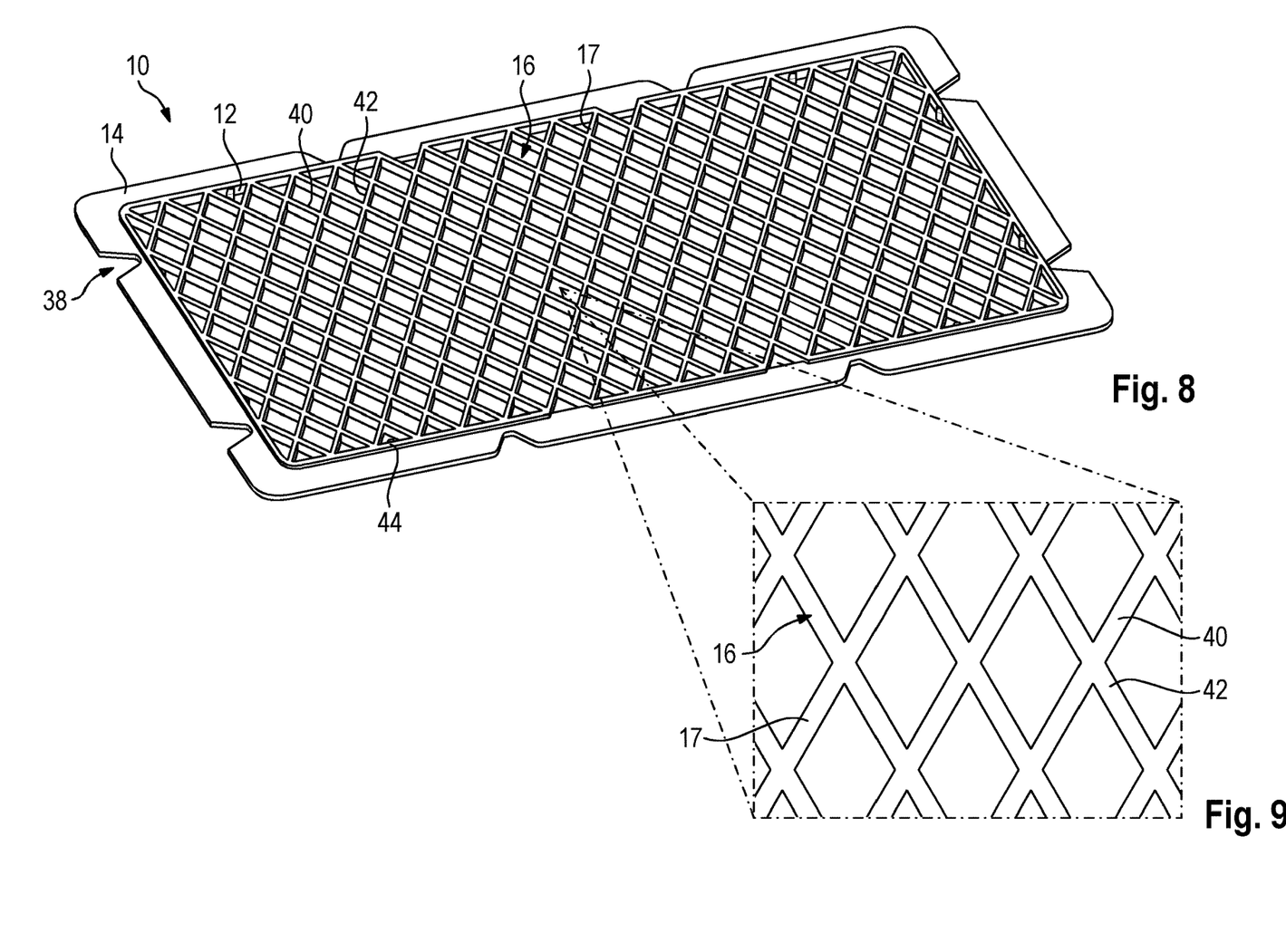
FIG. 8 shows a top view of a first cooking area of a food carrier used in a grilling accessory of the invention according to a second embodiment.
FIG. 9 shows a detail view of FIG. 8.

FIG. 8 shows the food carrier 10 in a perspective view. The food carrier 10 comprises a body 12 with a circumferential rim 14 which each includes recesses 38. The recesses 38 serve for the guidance and control of the flow of the casting material during manufacture, as will yet be explained below.

The food carrier 10 is shown in FIG. 8 from a first cooking area 16, which has a first structuring 17 which is formed as rhombic pattern. The first structuring 17 in particular can be seen in FIG. 9, which represents a section of the first cooking area 16 in detail.

The rhombic pattern of the first structuring 17 is formed by first struts 40, which extend parallel to each other, and by second struts 42 which likewise extend parallel to each other and intersect the first struts 40. The struts 40, 42 each have the same height, so that the surfaces of the struts 40, 42 form a plane for the first cooking area 16.

Furthermore, FIG. 8 reveals that the first cooking area 16 is slightly stepped from the rim 14, as a substantially circumferential first edge 44 is provided, with which the first structuring 17 terminates flush, in particular the struts 40, 42. This is also shown in FIG. 10, which shows a detail view of the transition of the first cooking area 16 to the rim 14.

Figure 10:
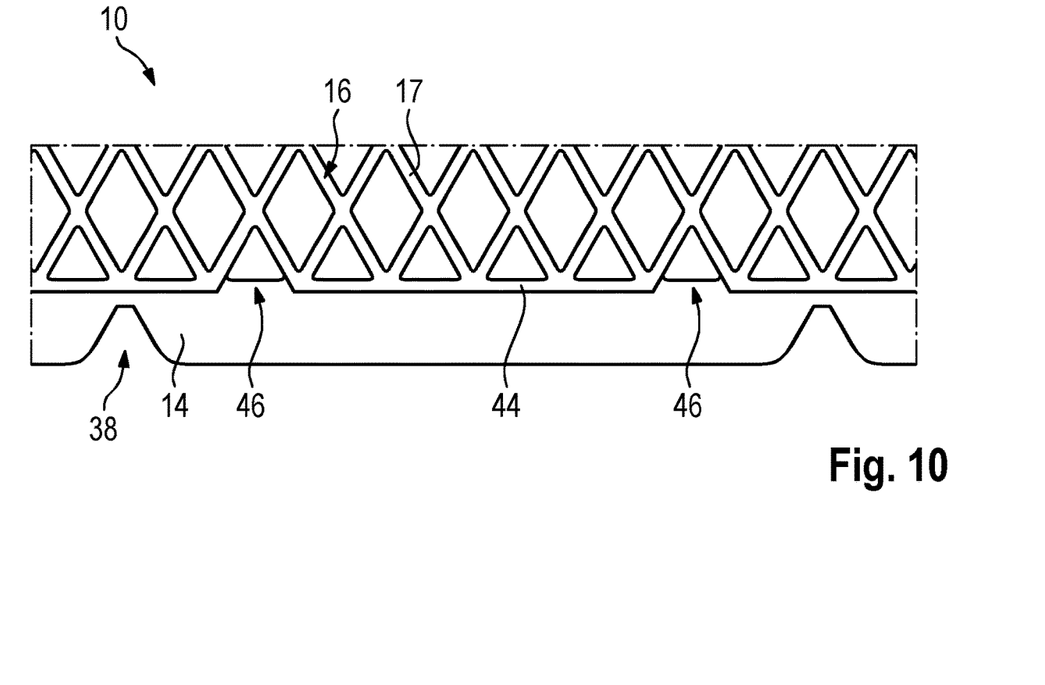
FIG. 10 shows a further detail view of FIG. 8.

FIG. 10 in addition clearly shows that the first edge 44 includes symmetrical first cutouts 46. These symmetrical first cutouts 46 are important during the manufacture of the food carrier 10, as the flow of the casting material can be influenced thereby. In particular, the flow of material is broken in the rim regions, so that during the manufacture a substantially homogeneous casting material front runs through the casting mold. It thereby is ensured that on the one hand no air inclusions occur within the cast food carrier 10 and on the other hand casting material meeting with each other substantially has the same temperature.

This is analogously true for the recesses 38 in the circumferential rim 14, as mentioned already.

Figure 11:
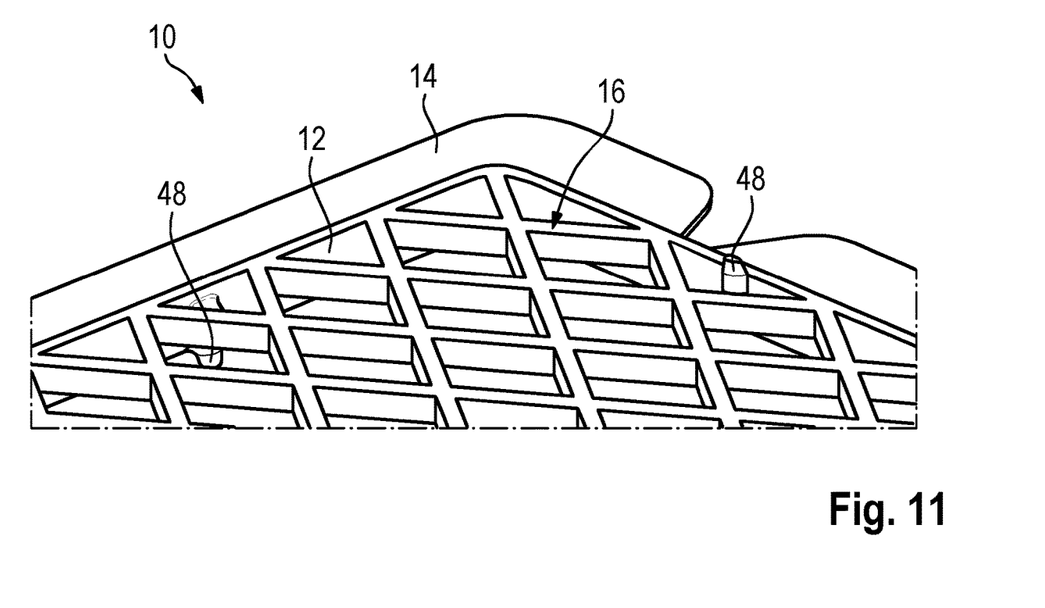
FIG. 11 shows a further detail view of FIG. 8.

FIG. 11 shows a further detail view of the first cooking area 16. This detail view shows protrusions 48 which are arranged in the rim region of the first cooking area 16 and extend across the plane of the first cooking area 16.

Furthermore, FIG. 11 reveals that the protrusions 48 analogously are associated to the second cooking area 18 which is provided opposite to the first cooking area 16. The protrusions 48 also extend across the plane of the second cooking area 18.

In general, the protrusions 48 act as stacking protection, since the protrusions 48 cooperate with the circumferential first edge 44 of a directly adjacent food carrier 10 of a stack of food carriers 10, in order to prevent slipping of the food carriers 10 relative to each other. For this purpose, the protrusions 48 laterally engage the circumferential first edge 44, so that slipping in the plane is prevented. For this purpose, the protrusions 48 in particular can be provided on all sides of the food carrier 10.

Furthermore, it is ensured by the protrusions 48 that a food carrier 10 put down on a deposition area does not directly rest on the deposition area via the respective cooking area 16, 18, but via the protrusions 48 which protrude from the respective cooking area 16, 18. This is important in particular when the cooking areas 16, 18 are provided with a coating which might be damaged.

Figure 12:
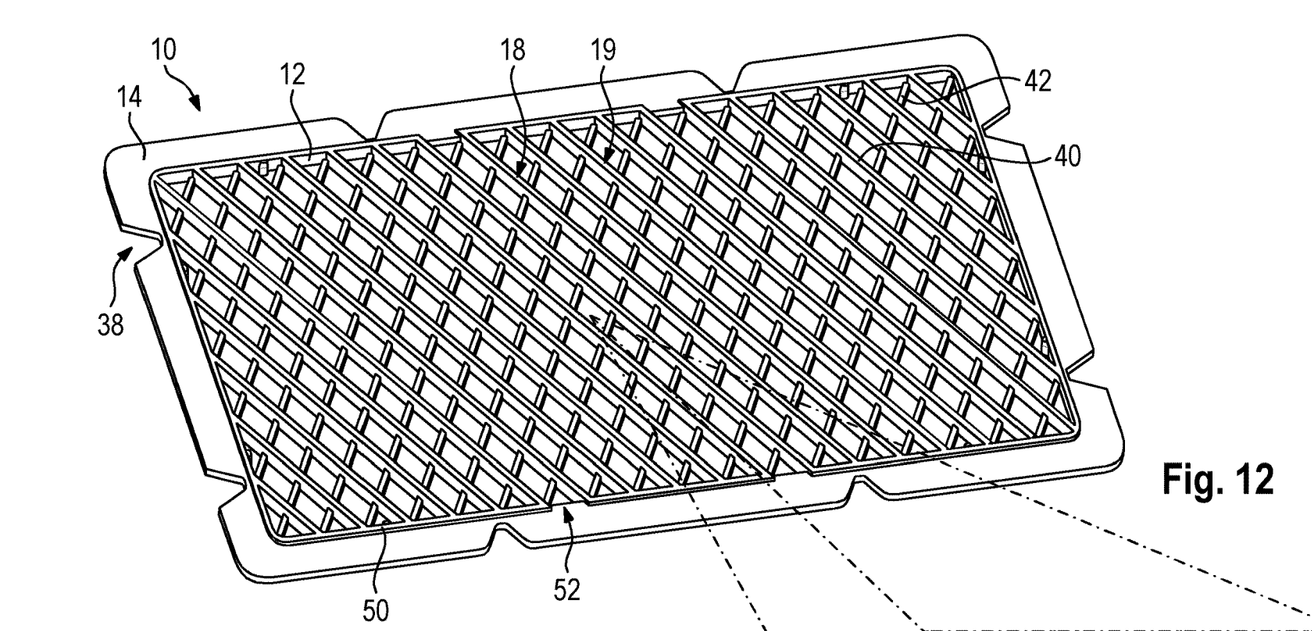
FIG. 12 shows a top view of a second cooking area of the food carrier as shown in FIG. 8.

FIG. 12 shows the food carrier 10 in a perspective view from the second cooking area 18. The second cooking area 18 has a second structuring 19 which differs from the first structuring 17 of the first cooking area 16. In the embodiment shown, the second structuring 19 is formed as stripe pattern, wherein the stripes extend at an angle with respect to the circumferential rim 14, i.e. not parallel to one of the edges of the circumferential rim 14.

Accordingly, the two structurings 17, 19 differ from a smooth, continuously even surface like that of a plate.

Analogous to the first cooking area 16, the second cooking area 18 is delimited against the rim 14 via a substantially circumferential second edge 50, wherein the second structuring 19 merges into the second edge 50.

Furthermore, the protrusions 48 also can cooperate with the circumferential second edge 50, in order to prevent slipping of the food carriers 10 when they are stacked.

The second structuring 19 formed as stripe pattern is realized in that the struts 40, 42 of the first structuring 17 formed as rhombic pattern, which extend parallel to each other, have a different depth. This can be taken in particular from FIG. 13, which shows a detail view of FIG. 12.

Figure 13:
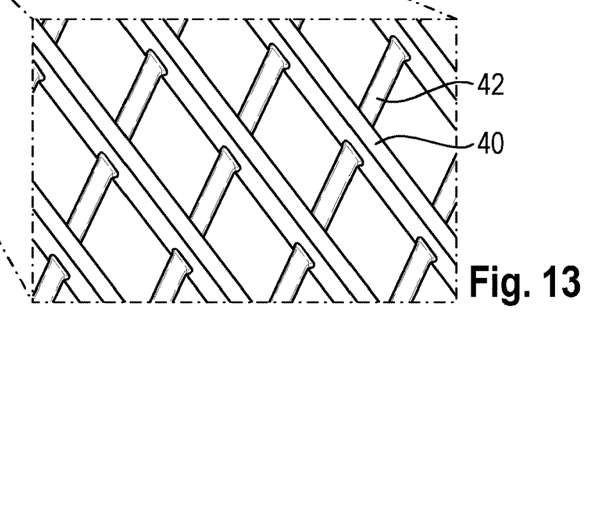
FIG. 13 shows a detail view of FIG. 12.

Due to the different depth, the one struts 40 are part of the first structuring 17 and at the same time form the second structuring 19, wherein opposite sides of these struts 40 serve this purpose.

The difference in height of these struts 40, 42 is such that the one struts 40, which at the same time form the second structuring 19, pass over flush into the second edge 50, whereas the other struts 42 only are so high that they pass over flush into the circumferential rim 14.

The integrally formed food carrier 10 thereby can be manufactured in a particularly simple way by means of a casting method.

The second edge 50 likewise includes symmetrical second cutouts 52, in order to correspondingly control the flow of the casting material during manufacture.

Both cooking areas 16, 18 thus are delimited from the rim 14 surrounding the respective cooking areas 16, 18 by a substantially circumferential edge 44, 50.

The embodiment of the food carrier 10 as shown in FIGS. 8 to 13 can be used in a way analogous to the first embodiment, which is shown in FIGS. 1 to 5, in order to form the grilling accessory 20.

Both embodiments of the food carrier 10 are characterized in that they are a turning food carrier which has two cooking areas 16, 18 on opposite sides, wherein both cooking areas 16, 18 can be used for cooking food. Both cooking areas 16, 18 also have a different structuring 17, 19, so that in the respective use a different grill pattern is obtained on the surface of the food.

Furthermore, both embodiments of the food carrier 10 do not have a smooth, continuously even surface as cooking area, but always a structured surface, so that a grill pattern can be produced in the surface of the food.

Furthermore, both embodiments are formed such that they have recessed cooking areas 16, 18. The food carriers 10 thereby can be manufactured in a correspondingly material-saving way, in particular by a casting method. In addition, the openings in the cooking areas 16, 18 can serve for the liquid of the food to flow off. Furthermore, hot air or steam can flow through the openings, in order to cook the food which is arranged on the respective cooking area 16, 18.

Figure 14:
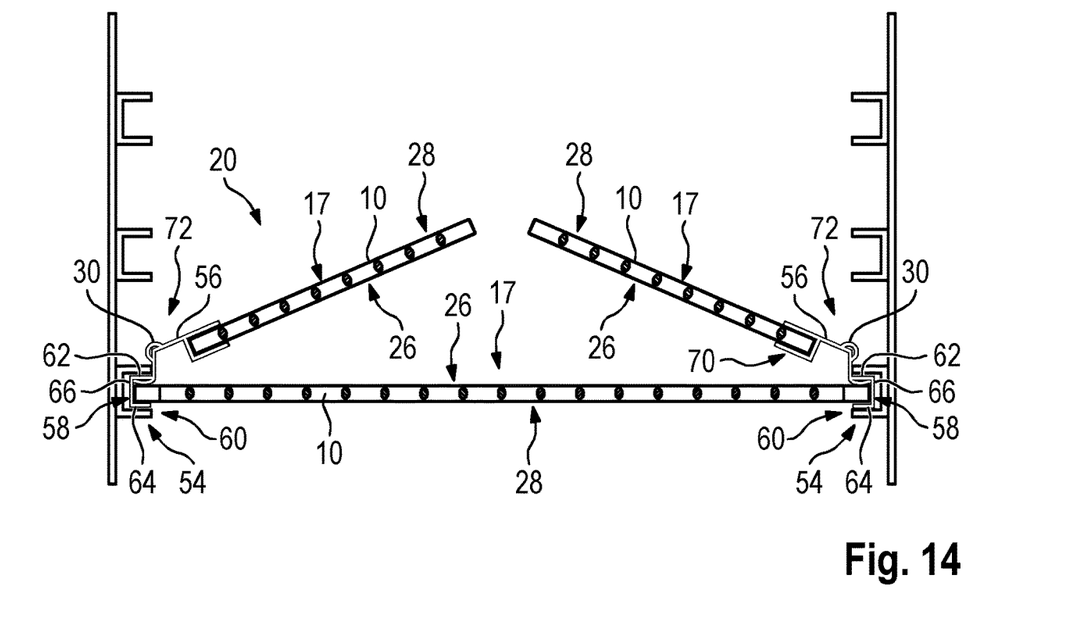
FIG. 14 shows a schematic sectional view of a grilling accessory of the invention according to a third embodiment.

In FIG. 14, a grilling accessory 20 according to a third embodiment is shown.

The grilling accessory 20 comprises three food carriers 10 that may be established by any of the food carriers 10 mentioned above.

As shown, the food carriers 10 each comprise at least one respective cooking area 26, 28 with a stripe structuring 17, in particular two cooking areas 26, 28 having the stripe structuring 17.

Hence, each of the food carriers 10 has openings in the respective cooking area 26, 28 ensuring that hot air or steam can flow through the openings in order to impinge on the food to be cooked. Further, meat juice or any other liquids may flow through the openings ensuring that the respective surface of the food to be cooked becomes crispy and/or crusty during the cooking, in particular the typical appearance of grilled food can be ensured.

Alternatively, the food carriers 10 may have a cross structuring or a rhombic structuring. As mentioned above, each of the food carriers 10 may also have two different structurings on the opposite sides.

The connecting elements 54 each interconnect a common food carrier 10, namely the lower food carrier 10 shown in FIG. 14, with another food carrier 10 being swivel-mounted via a holding member 56.

Figure 15:
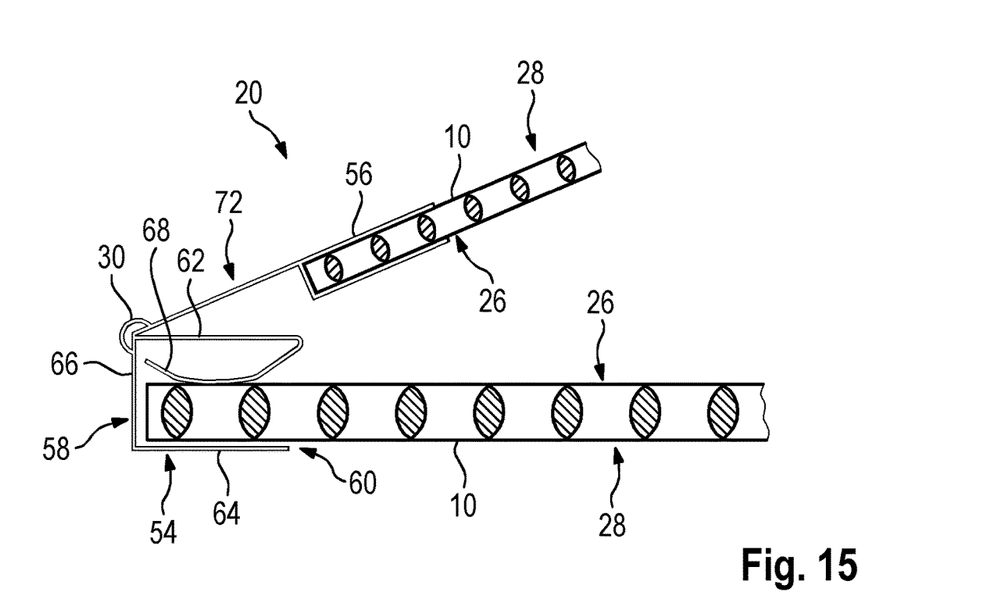
FIG. 15 shows a detail of the grilling accessory shown in FIG. 14.

In FIG. 15, a single connecting element 54 interconnecting two food carriers 10 is shown in more detail.

The swiveling function is ensured by respective joints 30 that connect the holding member 56 with a corresponding bracket 58 being a guidance 60 for the lower food carrier 10. Therefore, the bracket 58 comprises at least two legs 62, 64 being substantially parallel to each other as well as a connecting leg 66 being substantially perpendicular to the legs 62, 64.

As shown in FIG. 15, a spring 68 is associated to the first leg 62 wherein the spring 68 abuts the food carrier 10, in particular the upper side of the food carrier 10, that is accommodated in the guidance 60. Hence, the respective food carrier 10 is pressed against the second leg 64 by the spring force of the spring 68.

In the Figures, a small gap between the respective food carrier 10 and the bracket 58, in particular the second leg 64, is shown for illustrating that the connecting element 54 is formed separately with respect to the food carrier 10.

The holding members 56 that are connected to the brackets 58 via the joints 30 may comprise a reception 70 that may accommodate a respective food carrier 10 that can be swiveled with respect to the lower food carrier 10. Hence, the respective food carrier 10 may be inserted and fixed within the reception 70 of the holding member 56. Furthermore, the respective food carrier 10 can be removed appropriately to be used solely as described above. Such a holding member 56 with a reception 70 is shown on the right of FIG. 14.

Alternatively as shown for the left holding member 56 in FIG. 14, the connecting element 54 comprises the respective food carrier 10 in a permanent manner. Hence, the food carrier 10 is connected once the separately formed connecting element 54 is connected to the lower food carrier 10.

In general, the connecting elements 54 may be established by clip units 72 that can be easily connected with the separately formed food carrier 10, namely the lower one in FIG. 14.

Further, the joints 30 as shown in FIGS. 14 and 15 may have a telescopic hinge that is adjustable in height. Thus, the space between the food carriers 10 can be adjusted via the joint 10 in order to be adapted to the height of the food to be cooked.

As already mentioned, the grilling accessory 20 shown in FIG. 14 has three different food carriers 10 wherein each of the food carriers 10 has at least one cooking area 26, 28 which contacts the food at the same time. Two of the food carriers 10 are arranged with respect to the third food carrier 10 such that the respective cooking areas 26 face the cooking area 26 of the third food carrier 10, namely the lower one in FIG. 14. As already described, the two food carriers 10 are connected to the third food carrier 10 via joints 30, respectively.

Alternatively to the grilling accessory 20 shown in FIG. 14, the grilling accessory 20 may comprise only two different food carriers 10 which are interconnected by at least one connecting element 54 along one respective edge.

The connecting element 54 may also be called fixing element, suspension or guiding element as it fixes the at least two food carriers 10 and provides a guidance.

Figure 16:
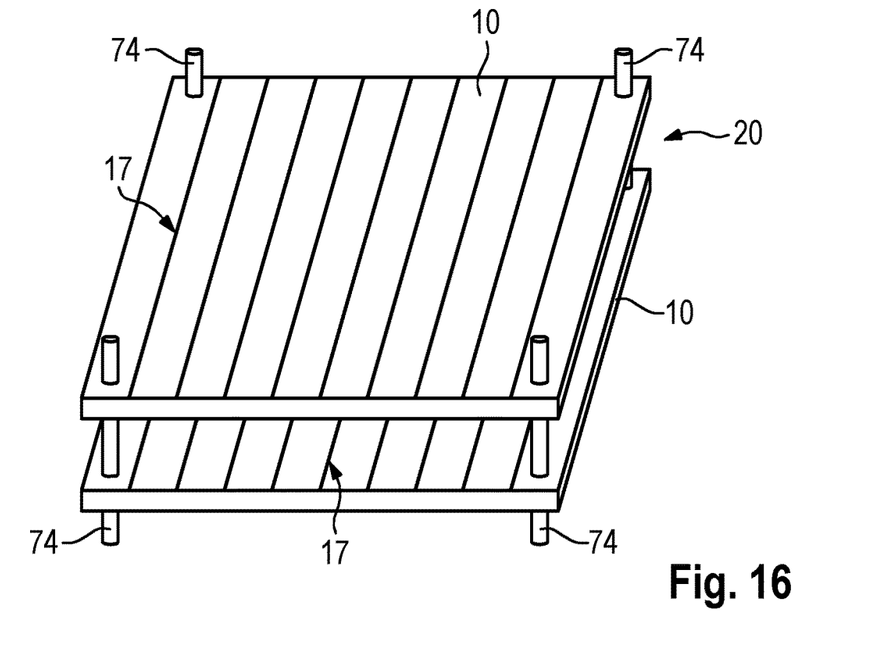
FIG. 16 shows a schematic perspective view of a grilling accessory of the invention according to a fourth embodiment.

Alternatively, a suspension 74 may be provided for connecting the at least two food carriers 10 of the grilling accessory 20 as shown in FIG. 16. Two food carriers 10 are shown that are interconnected via four suspensions 74 associated to the corners of the food carriers 10 having respective cutouts.

Generally, the grilling accessory 20 may also be formed in an integral manner.

Figure 17:
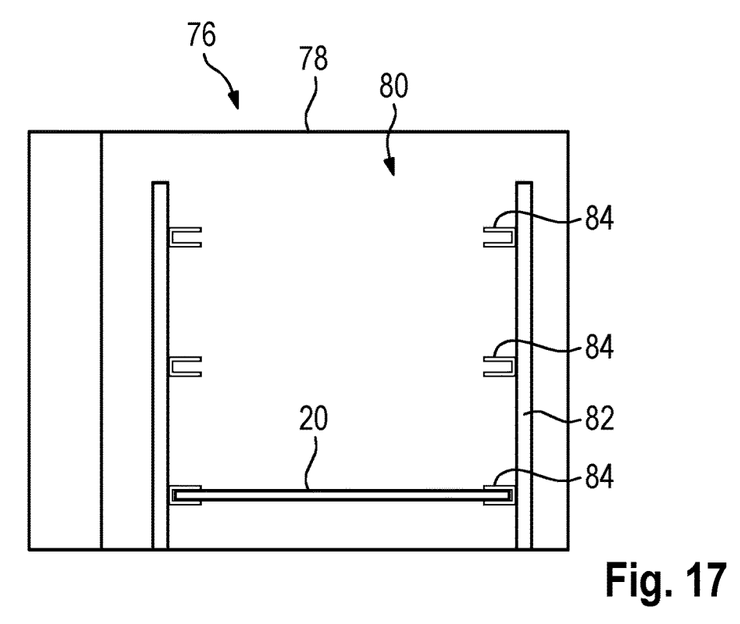
FIG. 17 shows a grilling system of the invention.

In FIG. 17, a grilling system 76 is shown that comprises a cooking appliance 78 with a cooking space 80. In the cooking space 80, a plating rack 82 is provided which has several loading tracks 84 each defining loading levels.

One of the loading tracks 84 is charged with a grilling accessory 20, in particular one of the grilling accessories 20 mentioned above. Thus, the respective grilling accessory 20 is held by the loading track 84 such that the food accommodated in the grilling accessory 20 is exposed to the atmosphere within the cooking space 80 during the operation of the cooking appliance 78. The hot air and/or steam can impinge on the food due to the openings in the respective food carrier(s) 10 being part of the grilling accessory 20.

The grilling accessory 20 is guided in the loading track 84 via the connecting element 54, in particular the guidance 60.

Furthermore, the loading tracks 84 may also be charged with one of the food carrier 10, in particular the ones used by the grilling accessory 20 provided that the respective food carrier 10 is formed separately with respect to the connecting element 54.

Accordingly, the intended grill pattern can be provided easily even though the food to be cooked is placed in a cooking appliance 78 having a cooking space 80 that generates a certain cooking atmosphere for cooking the food.

Depending on the food carrier(s) 10 and the respective structuring, two different grill patterns or the same grill pattern may be provided on the opposite sides of the food.

The invention claimed is:

1. A grilling accessory for use in a cooking space of a cooking appliance, which includes two food carriers with at least one cooking area each, which contact a food at the same time, wherein the food carriers are arranged to each other such that the respective cooking areas face each other, wherein at least one of the food carriers has openings in the respective cooking area, wherein the two food carriers are connected with each other via a connecting element comprising a joint, wherein the connecting element is established by a clip unit that comprises a guidance for at least one of both food carriers, wherein the guidance has a bracket with two legs being substantially parallel to each other, and wherein a spring is located at a first leg of the guidance such that the spring abuts the food carrier guided by the guidance.

2. The grilling accessory of claim 1 wherein each of the two cooking areas has a structuring, the structuring of a first of the two cooking areas being different from the structuring of the second of the two cooking areas.

3. The grilling accessory of claim 1 wherein at least one of the food carriers has a first cooking area and a second cooking area on which a food to be cooked can be placed, in particular grilling areas, wherein the first and second cooking areas are arranged on opposite sides of the food carrier, each of the first and second cooking areas having a structuring, the structuring of the first cooking area being different from the structuring of the second cooking area.

4. The grilling accessory of claim 1 wherein at least one of the cooking areas has at least one of a stripe structuring, a cross structuring and a rhombic structuring.

5. The grilling accessory of claim 1 wherein the spring is assigned to the upper side of the food carrier.

6. The grilling accessory of claim 1 wherein the connecting element comprises at least one swivel-mounted holding member that maintains one of both food carriers.

7. The grilling accessory of claim 1 wherein the connecting element comprises at least one swivel-mounted holding member that maintains one of both food carriers and wherein the at least one holding member is connected to the bracket via the joint.

8. The grilling accessory of claim 1 wherein the connecting element comprises at least one of the food carriers in a permanent manner.

9. The grilling accessory of claim 1 wherein the joint is formed by a telescopic hinge being adjustable in height.

10. The grilling accessory of claim 1 wherein the connecting element is formed separately with respect to at least one of the food carriers.

11. The grilling accessory of claim 1 wherein three food carriers are provided, each of the food carriers having at least one cooking area which contacts a food at the same time, wherein two food carriers are arranged with respect to the third one such that the respective cooking areas face the one of the third food carrier, wherein the two food carriers are connected to the third food carrier via a joint, respectively.

12. The grilling accessory of claim 11 wherein each of the two food carriers is connected to the third food carrier via a connecting element that comprises a guidance for the third food carrier, wherein the guidance has a bracket with two legs being substantially parallel to each other.

13. The grilling accessory of claim 12 wherein the clips each comprise one of the food carriers in a permanent manner.

* * * * *